(12) United States Patent
Kimura (10) Patent No.: US 11,743,573 B2
(45) Date of Patent: Aug. 29, 2023

(54) IMAGING APPARATUS FOR ADJUSTING PHOTOGRAPHING CONDITIONS ACCORDING TO PHOTOGRAPHED IMAGES AND METHOD FOR CONTROLLING IMAGING APPARATUS

(71) Applicant: CANON KABUSHIKI KAISHA, Tokyo (JP)

(72) Inventor: Naoto Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/445,743

(22) Filed: Aug. 24, 2021

(65) Prior Publication Data
US 2022/0070384 A1 Mar. 3, 2022

(30) Foreign Application Priority Data
Aug. 28, 2020 (JP) ................................ 2020-144855

(51) Int. Cl.
*H04N 23/63* (2023.01)
*H04N 23/62* (2023.01)
*H04N 23/611* (2023.01)

(52) U.S. Cl.
CPC ......... *H04N 23/631* (2023.01); *H04N 23/611* (2023.01); *H04N 23/62* (2023.01); *H04N 23/633* (2023.01)

(58) Field of Classification Search
CPC ......... H04N 5/232933; H04N 5/23216; H04N 5/23219; H04N 23/611; H04N 23/62; H04N 23/631; H04N 23/632; H04N 23/633

See application file for complete search history.

(56) References Cited

U.S. PATENT DOCUMENTS

| 2013/0215289 A1 | 8/2013 | Vitsnudel |
| 2014/0085511 A1 | 3/2014 | Toida et al. |

(Continued)

FOREIGN PATENT DOCUMENTS

| CN | 108540722 A | 9/2018 |
| CN | 112565599 A | 3/2021 |

(Continued)

OTHER PUBLICATIONS

The above documents were cited in a European Search Report dated Jan. 28, 2022, that issued in the corresponding European Patent Application No. 21193173.8.

*Primary Examiner* — Antoinette T Spinks
(74) *Attorney, Agent, or Firm* — Cowan, Liebowitz & Latman, P.C.

(57) ABSTRACT

An imaging apparatus, for performing photography in a state where a live image is displayed, includes: a display unit configured to display the live image on a display; a selection unit configured to select a plurality of photographed images; a generating unit configured to generate support information, which indicates a target for changing photographing conditions of the live image, on the basis of information on the selected photographed images, and to display the generated support information on the display; a changing unit configured to change the photographing conditions of the live image on the basis of a user operation; and a photographing unit configured to photograph the live image according to the changed photographing conditions.

17 Claims, 7 Drawing Sheets

(56) References Cited

U.S. PATENT DOCUMENTS

2016/0309093 A1    10/2016   Ishii et al.
2020/0137296 A1*   4/2020   Okada .................. H04N 23/633

FOREIGN PATENT DOCUMENTS

EP           3930304 A1    12/2021
JP       2017-116872 A    6/2017

* cited by examiner

IMAGING APPARATUS FOR ADJUSTING PHOTOGRAPHING CONDITIONS ACCORDING TO PHOTOGRAPHED IMAGES AND METHOD FOR CONTROLLING IMAGING APPARATUS

BACKGROUND OF THE INVENTION

Field of the Invention

The present invention relates to an imaging apparatus and a method for controlling the imaging apparatus.

Description of the Related Art

In recent years, a plurality of images posted on a social network service (SNS) or the like can be viewed in list form. If a list of images having similar subjects, compositions, brightness, and tinges is displayed, a sense of uniformity is created, eliciting a preferable impression of the appearance.

As a technique for photographing a plurality of images, Japanese Patent Application Publication No. 2017-116872 discloses a technique of displaying an image of an subject to be rephotographed and a live view image, which is a moving image being photographed, side by side and enabling a user to pose or make facial expressions during photography while confirming the image of an subject to be rephotographed.

However, even if a live view image, i.e., a moving image being photographed, is displayed next to a photographed image, it may require many efforts to adjust the photographing conditions to obtain similar compositions, brightness, and tinges. Furthermore, the difficulty of processing for adjusting compositions, brightness, and tinges after photography may require rephotograph of the same subject.

SUMMARY OF THE INVENTION

The present invention provides an imaging apparatus that can easily adjust photographing conditions such as compositions, brightness, and tinges according to photographed images while a live image is being viewed.

An imaging apparatus according to the present invention is the imaging apparatus for performing photography in a state where a live image is displayed, the imaging apparatus including: a display unit configured to display the live image on a display; a selection unit configured to select a plurality of photographed images; a generating unit configured to generate support information, which indicates a target for changing photographing conditions of the live image, on the basis of information on the selected photographed images, and to display the generated support information on the display; a changing unit configured to change the photographing conditions of the live image on the basis of a user operation; and a photographing unit configured to photograph the live image according to the changed photographing conditions.

Further features of the present invention will become apparent from the following description of exemplary embodiments with reference to the attached drawings.

DESCRIPTION OF THE EMBODIMENTS

Embodiment 1

Preferred embodiments of the present invention will be described below with reference to the accompanying drawings. In Embodiment 1, a list of photographed images and a live image is displayed on a live-view display screen during photography. An imaging apparatus generates support information based on information of photographed images. The support information includes information on the compositions, brightness, and tinges or the like of photographed images and provides support that enables a user to adjust the composition, brightness, and tinge or the like of a live image according to the photographed images. Based on the support information, the user can adjust the composition, brightness, and tinge of the live image according to the photographed images before photography.

The imaging apparatus according to Embodiment 1 is a smartphone with a camera function (hereinafter referred to as a smartphone). The present invention is not limited thereto. The imaging apparatus may be another apparatus having an imaging function, for example, a digital camera, a digital video camera, a cell phone, or other mobile electronic devices.

Figure 1:
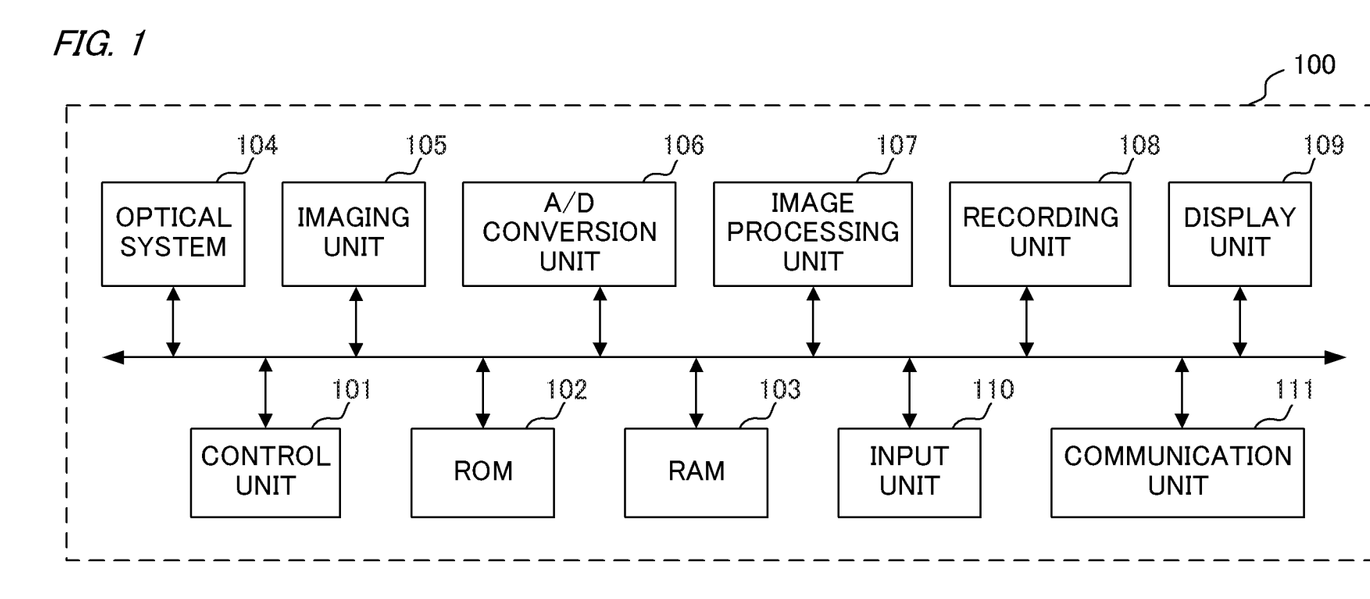
FIG. 1 is a block diagram illustrating a configuration example of an imaging apparatus.

Apparatus Configuration: FIG. 1 is a block diagram illustrating a configuration example of the imaging apparatus. Referring to FIG. 1, the configuration of a smartphone 100 acting as the imaging apparatus according to Embodiment 1 will be described below.

A control unit 101 is, for example, a processor such as a CPU or a DSP. Control programs for blocks provided in the smartphone 100 are read from a ROM 102 and are developed and executed in a RAM 103. This enables the control unit 101 to control the operations of the blocks provided in the smartphone 100.

The ROM 102 is a nonvolatile memory capable of electrical erasure and recording. The ROM 102 stores, for example, parameters used for the operations of the blocks in addition to the operation programs of the blocks provided in the smartphone 100.

The RAM 103 is a rewritable volatile memory. The RAM 103 is used for, for example, developing programs to be executed by the control unit 101 or the like and temporarily storing data generated by the operations of the blocks provided in the smartphone 100.

An optical system 104 includes lenses such as a zoom lens and a focus lens and forms a subject image on the imaging surface of an imaging unit 105. The imaging unit 105 is, for example, an imaging device such as a CCD or a CMOS sensor. The imaging unit 105 photoelectrically converts a subject image formed on the imaging surface of the imaging unit 105 by the optical system 104 and then outputs an obtained analog image signal to an A/D conversion unit 106.

The A/D conversion unit 106 converts the inputted analog image signal into digital image data. The digital image data outputted from the A/D conversion unit 106 is temporarily stored in the RAM 103.

To the image data stored in the RAM 103, an image processing unit 107 applies various kinds of image processing for developing and displaying or recording the digital image data. The image processing applied to the digital image data includes, for example, correction of a pixel defect caused by the optical system 104 or the imaging device, demosaicing, white balance correction, color interpolation, and gamma processing.

A recording unit 108 records data including image data in a recording medium accommodated therein. A display unit 109 includes a display device such as an LCD (Liquid Crystal Display) and displays images stored in the RAM 103 and images recorded in the recording unit 108 on the display device. Moreover, the display unit 109 displays an operation user interface or the like for receiving a user instruction.

An input unit 110 is an input interface including various physical operation members such as a touch panel and a shutter release and receives the input of a user instruction. A communication unit 111 is connected to an external server by radio and transmits and receives data including image data and layout information. The external server is, for example, a server for controlling services such as a social network service (hereinafter referred to as an SNS), in which a user transmits photographed images and releases the images to SNS users.

The smartphone 100 provides live view display for sequentially displaying analog image signals, which are sequentially outputted from the imaging unit 105, on the display device through the A/D conversion unit 106, the RAM 103, the image processing unit 107, and the display unit 109 under the control of the control unit 101. During the live view display, the user can adjust a composition in preparation for main shooting on the assumption that image data is recorded in the recording medium. Furthermore, during the live view display, the user changes exposure conditions such as a diaphragm and a shutter speed and image processing conditions for changing image qualities such as brightness, grades, and tinges, thereby preparing for main shooting.

Figure 2A:
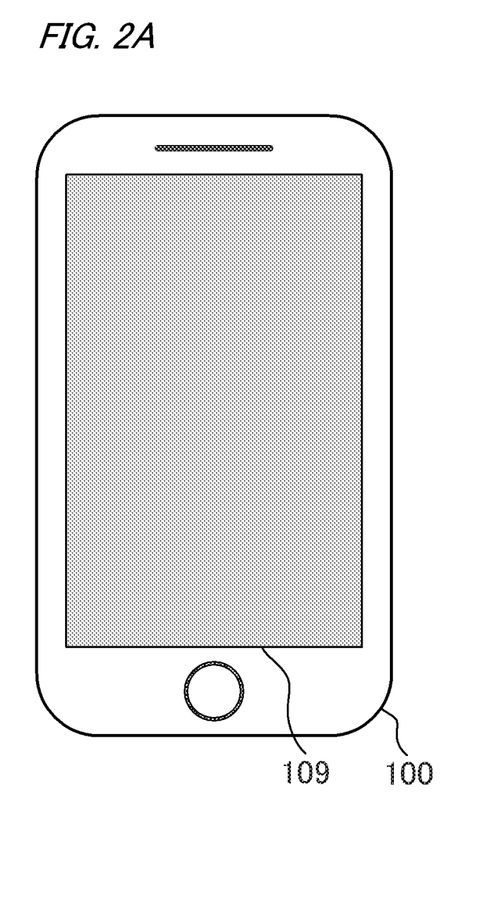
FIGS. 2A and 2B are views illustrating the appearance of the imaging apparatus.
Figure 2B:
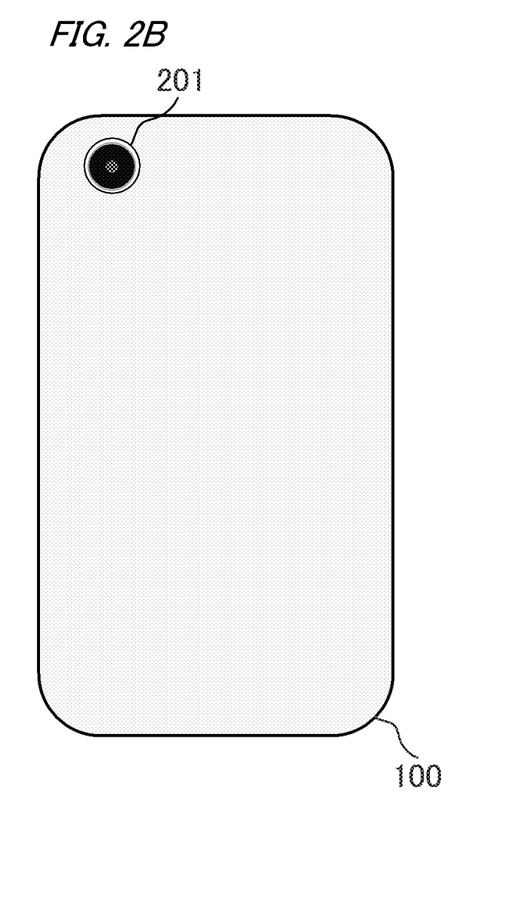

FIGS. 2A and 2B are views illustrating the appearance of the imaging apparatus. Referring to FIGS. 2A and 2B, the appearance of the smartphone 100 acting as the imaging apparatus will be described below. FIG. 2A is a front view of the smartphone 100 while FIG. 2B is a rear view of the smartphone 100.

The smartphone 100 includes the display unit 109 and a camera unit 201. The camera unit 201 includes the optical system 104, the imaging unit 105, and the A/D conversion unit 106 that are illustrated in FIG. 1.

Figure 3:
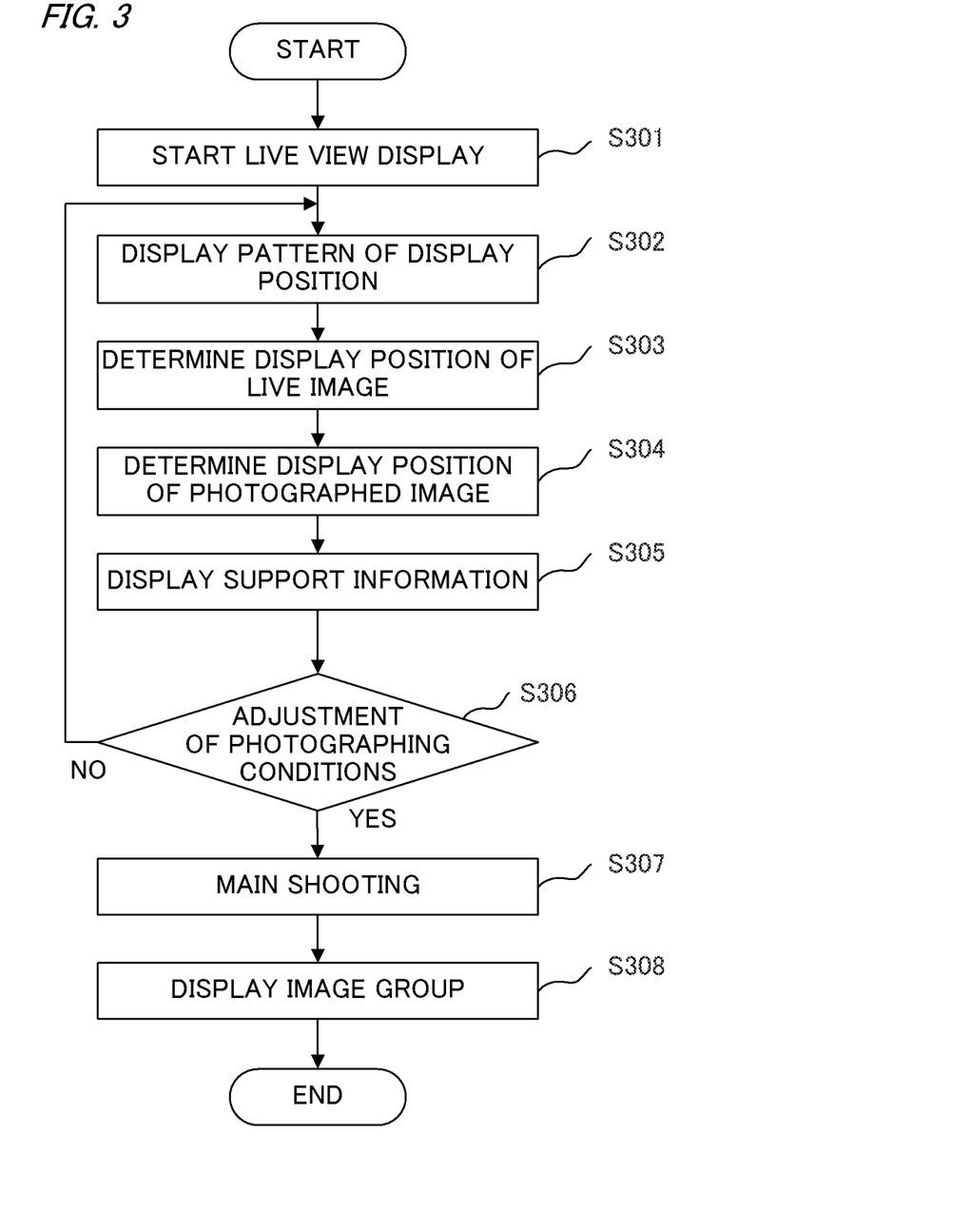
FIG. 3 is a flowchart indicating photography according to Embodiment 1.

Photography according to Embodiment 1. FIG. 3 is a flowchart indicating photography according to Embodiment 1. Referring to FIG. 3, the photography of the smartphone 100 according to the present embodiment will be specifically described below. The steps of photography are performed by the control unit 101 or the blocks of the smartphone 100 having received an instruction from the control unit 101.

The photography in FIG. 3 is started by switching the smartphone 100 to a shooting mode, which enables shooting with a camera, by the user. For example, the user launches a camera application on the smartphone 100, thereby switching the smartphone 100 to the shooting mode.

In step S301, the control unit 101 starts live view display by controlling the optical system 104, the imaging unit 105, the A/D conversion unit 106, the RAM 103, the image processing unit 107, and the display unit 109.

In the period of live view display, the smartphone 100 sequentially captures live images. The captured live images are displayed on the display device of the display unit 109. The user can adjust the composition and change the exposure conditions and the image processing conditions while confirming the sequentially displayed live images. Processing in steps S302, S303, S304, S305, and S306, which will be described later, is processing performed during the period of live view display.

In step S302, the control unit 101 displays a pattern of the display positions of placed images on the display unit 109. The pattern includes a plurality of separate regions. The control unit 101 displays a predetermined pattern or a pattern selected by the user.

Figure 4A:
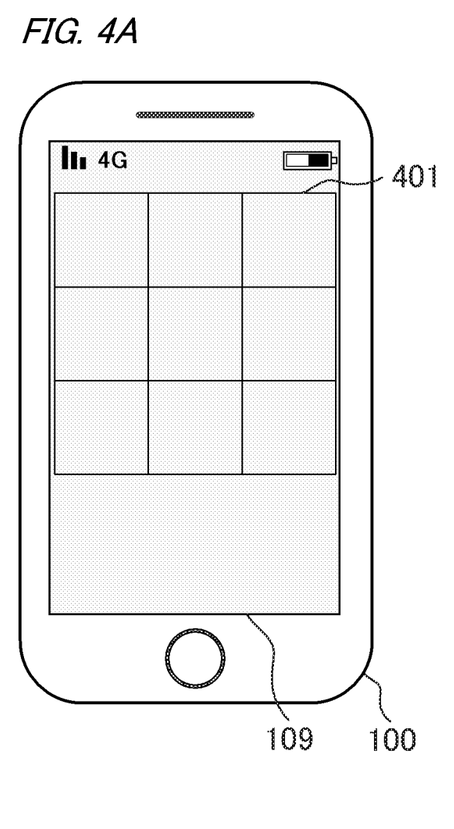
FIGS. 4A to 4C are explanatory drawings illustrating the layout of a live image and photographed images.

Referring to FIG. 4A, the pattern of image display positions will be described below. The pattern of display positions includes a plurality of frames (regions) for placing images. For example, the user can select the display position of an image by dragging the image into a specific region of the pattern after selecting the image from images not being laid out on the display unit 109.

FIG. 4A illustrates an example of a live-view display screen that displays a pattern 401 of display positions on the display unit 109. The pattern 401 includes nine rectangular regions in three rows and three columns. The rectangular regions indicate positions for placing a live image and photographed images. Each of the images is placed in each of rectangular regions. The pattern 401 is a pattern where nine images can be displayed in list form.

The pattern of the display positions is not limited to the example of FIG. 4A. For example, the pattern of display positions may include four regions for placing four images. Moreover, the separate regions are not limited to rectangles. The regions may be formed in various shapes such as a circle and a polygon. The pattern of display positions may include regions having different sizes. Alternatively, the display positions of images may be determined by freely arranging images in a predetermined region by the user without using a pattern.

In step S303, the control unit 101 determines a display position for a live image of a subject to be photographed, from the rectangular regions of the pattern 401 displayed on the live-view display screen. For example, the control unit 101 can determine, as the display position of a live image, the region selected by the user from the regions included in the pattern 401.

Figure 4B:
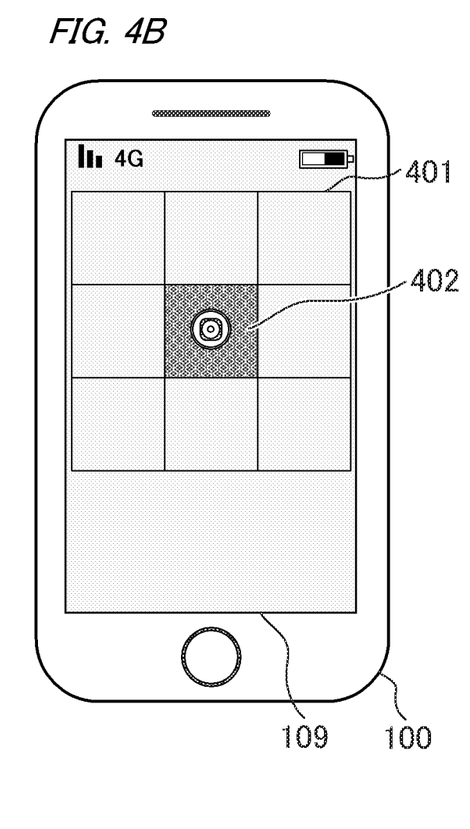

Referring to FIG. 4B, the determination of the display position of a live image will be described below. The user selects one of the rectangular regions for the display of a live image with a touch while the pattern 401 of display positions is displayed as illustrated in FIG. 4A. The control unit 101 sets, as the display position of the live image, the rectangular region selected by the user and displays the live image in the rectangular region.

A live-view display screen in FIG. 4B indicates an example in which the user selects a central rectangular region 402 as the display position of the live image from the nine rectangular regions. The control unit 101 determines the rectangular region 402 as the display position of the live image and displays the live image in the rectangular region 402. In the example of FIG. 4B, the rectangular region 402 displays a slice of bread with a sunny-side up egg on a plate. The display position of a live image is not always selected and determined by the user. For example, the display position of a live image may be set in advance for each pattern.

In step S304, the control unit 101 (a selection unit) selects photographed images and determines the display positions of the photographed images in the pattern 401 based on a user operation. The user operation is, for example, an operation for dragging and dropping the image selected from photographed images that are not laid out on the display unit 109, to a desired position (region) in the pattern 401. The control unit 101 places the photographed image in the region to which the user has dragged and dropped the image selected from the photographed images that are not laid out.

Figure 4C:
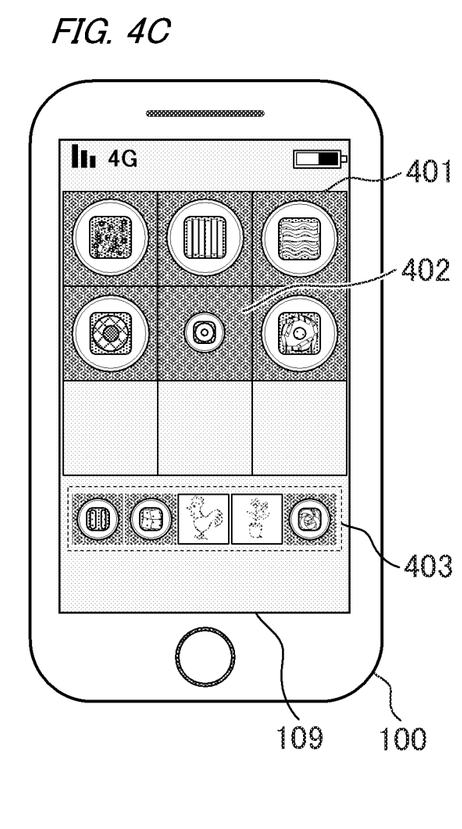

Referring to FIG. 4C, the selection and layout of photographed images will be described below. A live-view display screen in FIG. 4C indicates an example in which five photographed images are placed around the rectangular region 402, which is the display position of the live image, by the processing of step S304.

In step S303, when the display position of the live image is determined, the control unit 101 displays a list 403 of photographed images that are not laid out, at a different position from the pattern 401. In the example of FIG. 4C, the list 403 of photographed images that are not laid out indicates five photographed images that are not laid out. The images indicated in the list 403 of photographed images that are not laid out are acquired from the recording unit 108. The user selects desired one of the photographed images while confirming the list 403 of photographed images that are not laid out on the live-view display screen, and then the user drags and drops the image to a desired position in the pattern 401, thereby placing the photographed images one by one.

It is assumed that in order to display a list of uniform subjects, compositions, brightness, and tinges, the user selects and places photographed images having similar subjects, compositions, brightness, and tinges. In the example of FIG. 4C, in the list 403 of photographed images that are not laid out, the images of a chicken and a flower are different subjects from the slice of bread in the live image displayed in the rectangular region 402. Thus, the user selects an image of a slice of bread like the live image instead of an image of a chicken or a flower from the list 403 of photographed images that are not laid out. As described above, the control unit 101 places photographed images in the pattern 401 based on a user operation for placing a desired image at a desired position.

The layout of photographed images is not always determined based on a user operation. The control unit 101 may analyze images in the list 403 of photographed images that are not laid out, and place images similar in subject, composition, brightness, and tinge to the live image in the pattern 401.

In step S305, the control unit 101 (a generating unit) generates and displays support information used for changing the photographing conditions of the live image, from information on photographed images that are laid out in step S304. The support information indicates the average photographing conditions of photographed images that are laid out in step S304. The photographing conditions indicate image processing conditions for changing compositions, exposure conditions (brightness), colors, and gradations.

Specifically, the support information on compositions is, for example, a composition line indicating the average position and size of subjects in photographed images. The support information on brightness is, for example, the average brightness of photographed images. The average brightness is indicated as a target value on a slider bar. The support information on tinges is, for example, the average color temperature of photographed images. The average color temperature is indicated as a target value on a slider bar.

Figure 5A:
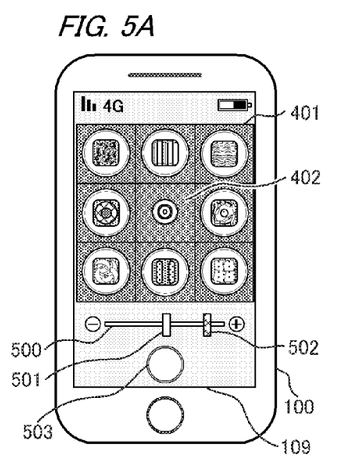
FIGS. 5A to 5H are explanatory drawings illustrating the adjustment of the live image.
Figure 5B:
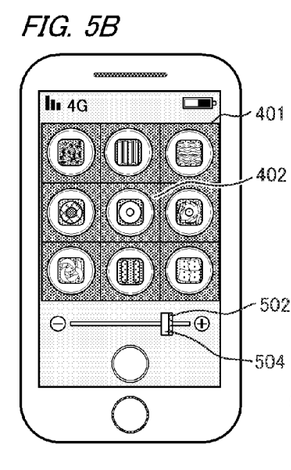

Referring to FIGS. 5A to 5G, a method for adjusting the composition will be described as an example of the adjustment of the photographing conditions based on the support information. FIGS. 5A and 5B are explanatory drawings illustrating the generation of the support information.

FIGS. 5A and 5B illustrate an example of a live-view display screen where eight photographed images are placed around the live image (rectangular region 402) in step S304. A slider bar 500 is a user interface (UI) for rescaling the live image in order to adjust the composition. A shutter button 503 is a UI for photography with a press or touch.

In the live-view display screen of FIG. 5A, a slice of bread as the subject of a live image in the rectangular region 402 is smaller in size than those of the photographed images placed around the rectangular region 402. In this state, the live image and the photographed images have different subject sizes, so that the list of a photographed subject image and the photographed images may be displayed with less uniformity and result in poor display.

The user can zoom in the live image by moving an indicator 501 of the slider bar 500 in the positive direction. However, the user cannot identify the degree of sliding for obtaining the same size as the surrounding photographed images. Thus, the control unit 101 displays a target position 502 as a guide for moving the indicator 501. As illustrated in FIG. 5B, the user moves the indicator 501 to the position of an indicator 504 toward the target position 502, thereby adjusting the subject of the live image to the same size as the subjects of the surrounding photographed images.

The support information indicating the target position 502 is generated based on the information on the photographed images that are selected in step S304. The target position 502 is generated as, for example, a scaling factor that allows the subject of the live image to have substantially the same size as the subjects of the photographed images. The information on the photographed images used for generating the support information indicates the compositions, brightness, and tinges or the like of the photographed images. For example, the support information can be calculated by (Expression 1).

[Math. 1]

$$S = \frac{\sum_{k=1}^{N} I_k}{N} \quad \text{(Expression 1)}$$

where S is the support information, $I_k$ is the information on the photographed images, and N is the total number of photographed images. In other words, the support information S can be calculated as the mean value of the information on the photographed images, for example, information including a scaling factor, a focal length, and a shooting distance during photography.

The support information is not always calculated according to the method of (Expression 1). For example, the support information may be calculated with the weighted information $I_k$ on the photographed images according to a distance between the photographed images and the live image or whether the photographed images are adjacent to the live image. In other words, the control unit 101 may calculate the support information by weighting the information $I_k$ on the photographed images according to the positional relationship with the live image.

FIG. 5A illustrates the example of the adjustment of a scaling factor. Thus, S and $I_k$ indicate the value of a scaling factor, a focal length, or a shooting distance. For example, the control unit 101 may calculate the support information S by substituting a scaling factor during the photography of the photographed and placed images into (Expression 1) and display the target position 502 at a position corresponding to the mean value of calculated scaling factors. It is assumed that the photographing conditions such as a scaling factor during the photography of the photographed images are recorded in the images as metadata on the photographed images.

Alternatively, the control unit 101 may generate, by using image processing such as object recognition, the ratio of an object (subject) in the image as the support information for adjusting a scaling factor. In other words, the control unit 101 detects a subject from each of the photographed and placed images and calculates the ratio of the subject in the image. The control unit 101 can substitute the ratio calculated for each of the photographed images into (Expression 1) and calculate the support information S (target value) about the ratio of the subject in the live image.

Furthermore, $I_k$ in (Expression 1) is not limited to information on the adjustment of a scaling factor. For example, $I_k$ in (Expression 1) may be information on color temperatures in the adjustment of white balance or information on the average brightness or By (Brightness Value) of the screen in the adjustment of brightness.

The support information S calculated by (Expression 1) is displayed as the target position 502 on the slider bar 500 as illustrated in FIG. 5A. The example of FIG. 5A illustrates the single slider bar 500 for adjusting a scaling factor. The present invention is not limited to this example. The live-view display screen may display a plurality of slider bars for adjusting other photographing conditions such as while balance or brightness in addition to a scaling factor. The support information on white balance or brightness is generated such that the white balance or brightness of the live image is substantially equal to that of the photographed images. The support information is displayed as a target value on the corresponding slider bar.

Figure 5C:
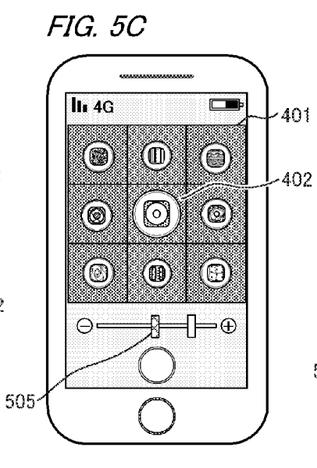
Figure 5D:
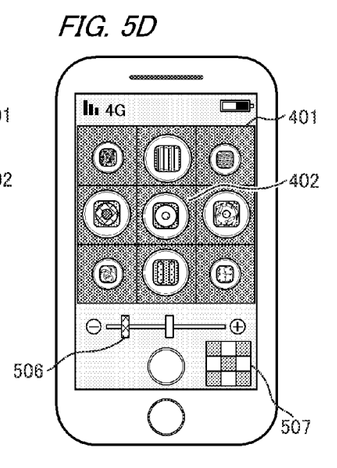

FIGS. 5C and 5D are explanatory drawings illustrating a change of the support information when the photographed images on the live-view display screen are changed to other photographed images. FIG. 5C illustrates an example in which the photographed images on the live-view display screen are changed to images having smaller subjects than the photographed images placed in FIG. 5B. When the photographed images are changed, the control unit 101 substitutes information on the changed photographed images into (Expression 1) and recalculates the support information S. The control unit 101 moves the target position 502 on the slider bar 500 to a target value 505 based on the calculated support information S.

FIG. 5D illustrates an example in which the support information is generated by specifying a layout. The layout is a predetermined layout pattern for categorizing the regions in the pattern 401 into a plurality of groups and placing the images with uniformity in each of the groups. In a layout 507 of FIG. 5D, the nine rectangular regions in three rows and three columns are categorized into a first group including the rectangular regions at the center and the four corners and a second group including the other rectangular regions. In other words, the photographed images of the first group are photographed images diagonal to the live image.

The predetermined layout pattern is not limited to the layout 507 illustrated in FIG. 5D. The layout pattern may be, for example, a lattice layout pattern in which the first group includes the rectangular regions in the same row as the live image while the second group includes the rectangular regions in the other rows. The layout may be preset by the user or changed by the user on the live-view display screen.

In FIG. 5D, the subjects of the photographed images at the four corners in the first group of the layout 507 are smaller than the subjects of the photographed images of the second group. The live image of the rectangular region 402 is included in the first group but has a larger subject than the subjects of the photographed images at the four corners. In this case, the control unit 101 calculates the support information S according to (Expression 1) by using the information on the photographed images included in the first group of the layout 507. The live image of the rectangular region 402 has a larger subject than the subjects of the photographed images at the four corners, so that a target value 506 is displayed on the negative-direction side of the current position of the indicator. As described above, the support information may be generated based on the information on some photographed images selected based on positions in the layout 507, from among the photographed images placed on the live-view display screen.

Figure 5E:
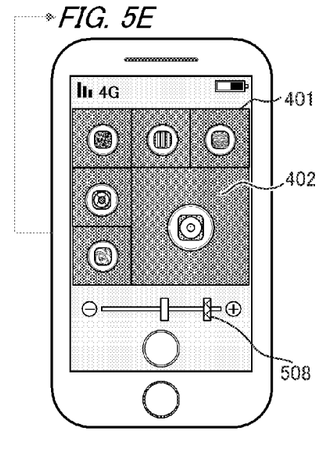
Figure 5F:
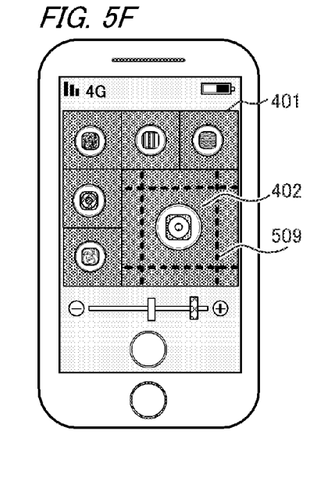

FIGS. 5E and 5F are explanatory drawings illustrating support information if the pattern 401 includes regions of different sizes. FIGS. 5E and 5F illustrate an example in which the rectangular region 402 for displaying the live image is larger than other regions including photographed images. Regardless of the sizes of the regions in the pattern 401, the control unit 101 can generate the support information based on information on the photographed and placed images and display a target value 508 on the slider bar 500.

As illustrated in FIG. 5F, the control unit 101 may display support information that is composition lines 509 for positioning a subject, in addition to the support information (target value 508) on the slider bar 500. The support information indicated by the composition lines 509 is generated such that the ratio of the subject in the image is substantially equal to the ratio of the subject in the photographed image. The control unit 101 can calculate the target value of a subject size in the live image and display the composition lines 509 based on the support information S calculated by (Expression 1).

In the example of FIG. 5F, the display region of the live image is divided into rectangles by the composition lines 509 that are two pairs of intersecting parallel lines. The central rectangle indicates a subject size as a guide. The present invention is not limited to this example. The composition lines as the support information may be frame lines including a circle, an ellipse, a square, and a triangle that indicate the size and position of a subject. The composition lines may include a vertical line, a horizontal line, and a diagonal line that divide the display region of the live image into multiple regions and indicate a composition. The user can change the scaling factor with the slider bar 500 according to the composition lines and position the subject by reorienting the smartphone 100.

The control unit 101 can generate the composition lines as the support information by detecting the subjects of the photographed images on the live-view display screen and analyzing the composition. Alternatively, the control unit 101 may select composition lines as support information from the template of prepared composition lines based on the detection results of the subjects of photographed images.

Figure 5G:
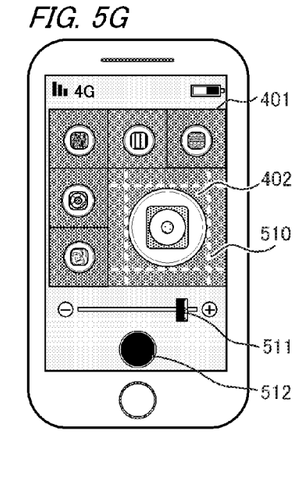

FIG. 5G is an explanatory drawing of a display example in which the user changes the photographing conditions according to the support information and is informed that the photographing conditions are changed close to the support information. In the example of FIG. 5G, the control unit 101 informs the user that the photographing conditions are changed close to the support information by changing composition lines 510, an indicator 511 of the slider bar 500, and the color of a shutter button 512. Alternatively, the control unit 101 may emit a sound without changing the support information or the color of the operation button or the like, or may vibrate the smartphone 100 to provide a notification.

Whether the photographing conditions have been changed close to the support information can be determined depending on, for example, whether the indicator 504 of the slider bar 500 has moved to a position within a predetermined distance from the target position 502 in FIG. 5B. Moreover, whether the photographing conditions have been changed close to the support information can be determined depending on whether the boundary of the subject has moved to a position within a predetermined distance from the composition lines 510 in FIG. 5G. Furthermore, if the support information is composition lines including two diagonal lines intersecting each other, whether the photographing conditions have been changed close to the support information may be determined depending on whether a distance between the intersection point of the diagonal lines and the center of the subject has decreased to a predetermined threshold value or less.

By adjusting the photographing conditions according to the support information, the user can photograph a live image with uniformity with the photographed images placed in step S304. Even if the display region of the live image is small and less recognizable due to the display of the photographed images, the user can easily adjust the photographing conditions by a simple operation of matching with the support information.

In step S306 of FIG. 3, the control unit 101 determines whether the adjustment of the photographing conditions by the user has been completed. The control unit 101 can determine whether the adjustment of the photographing conditions has been completed depending on, for example, whether the user has adjusted the photographing conditions and pressed a shutter button 503. If the adjustment of the photographing conditions has been completed (step S306: YES), the processing advances to step S307. If the adjustment of the photographing conditions has not been completed (step S306:NO), the processing returns to step S302, and then the processing of steps S302, S303, S304, and S305 is repeated until the adjustment of the photographing conditions is completed. In this way, the control unit 101 (a changing unit) adjusts the layout, composition, brightness, and tinge of the live image based on a user operation according to the support information, thereby photographing an image with uniformity with the photographed images.

In step S307, the control unit 101 performs main shooting after the adjustment of the live image is completed and the shutter button 503 is pressed by the user in step S306. Since the photographing conditions are adjusted based on the support information, an image photographed in main shooting is substantially identical in composition, brightness, and tinge to the photographed images displayed on the live-view display screen.

The control unit 101 associates, as one image group, the photographed image of a live image in main shooting with the photographed images placed on the live-view display screen. Moreover, the control unit 101 associates image data, which indicates the photographed image of the live image and the photographed images, with layout information including the display position of the live image and the display positions of the photographed images, and records the image data in the recording unit 108.

In step S308, the control unit 101 acquires the image data on the image group recorded in the recording unit 108 and the layout information and displays the image data on the image group on the display unit based on the acquired layout information.

Figure 5H:
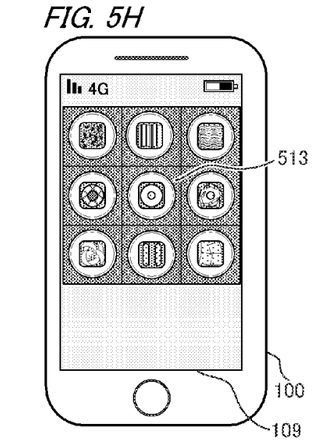

Referring to FIG. 5H, the image-group display screen for displaying the image data in the image group will be described below. The image-group display screen of FIG. 5H indicates an example in which a photographed image of the subject by main shooting is displayed in a rectangular region 513 and the photographed images associated with the photographed subject image are displayed around the subject image. The control unit 101 places the image data in the image group on the display screen of the display unit 109 based on the acquired layout information of the image group.

In Embodiment 1, referring to the support information generated based on the information on the photographed images on the live-view display screen, the user can adjust the photographing conditions including the composition, brightness, and tinge of the live image according to the photographed images.

In this way, the user adjusts the photographing conditions according to the displayed support information and photographs the subject, thereby easily generating an image group with uniformity. Moreover, even if the region for displaying the live image is reduced by displaying the photographed images and leads to difficulty in adjustment, the user can easily adjust the photographing conditions according to the support information.

Embodiment 1 described the adjustment of the composition of the live image to the photographed images displayed on the live-view display screen. The adjustment of the live image is not limited thereto. For example, in the adjustment of the live image, the exposure conditions may be adjusted or the image processing conditions may be adjusted to change image quality, e.g., brightness, gradations, or tinges.

Specifically, in the adjustment of the exposure conditions, an exposure correction amount may be adjusted to adjust the brightness of the live image. Alternatively, in the adjustment of the image processing conditions, a chroma enhancement may be adjusted to adjust the vivid colors of the live image. Furthermore, in Embodiment 1, the live-view display screen displays the photographed images with the live image. The live image and the support information may be displayed without the photographed images during photography.

Embodiment 2

In Embodiment 2, photographed images on a live-view display screen are acquired from, for example, an external server for providing the service of an SNS. A live image is displayed with the photographed images from the external server on the live-view display screen during photography. Support information is generated from the photographed images from the external server. Based on the generated support information, a user can adjust the composition, brightness, and tinge of the live image according to the photographed images before photography. The configuration of an imaging apparatus (smartphone) according to Embodiment 2 is identical to that of the smartphone 100 according to Embodiment 1 in FIG. 1, and thus the explanation thereof is omitted.

The external server receives an image group of photographed images and corresponding layout information from a plurality of imaging apparatuses (smartphones 100) and records the image group and the layout information in the recording unit of the external server. When access is made from a web browser or the like, the external server can display a list of the photographed images in the image group on the smartphone 100, which has accessed the external server, based on the layout information recorded in the recording unit.

Figure 6:
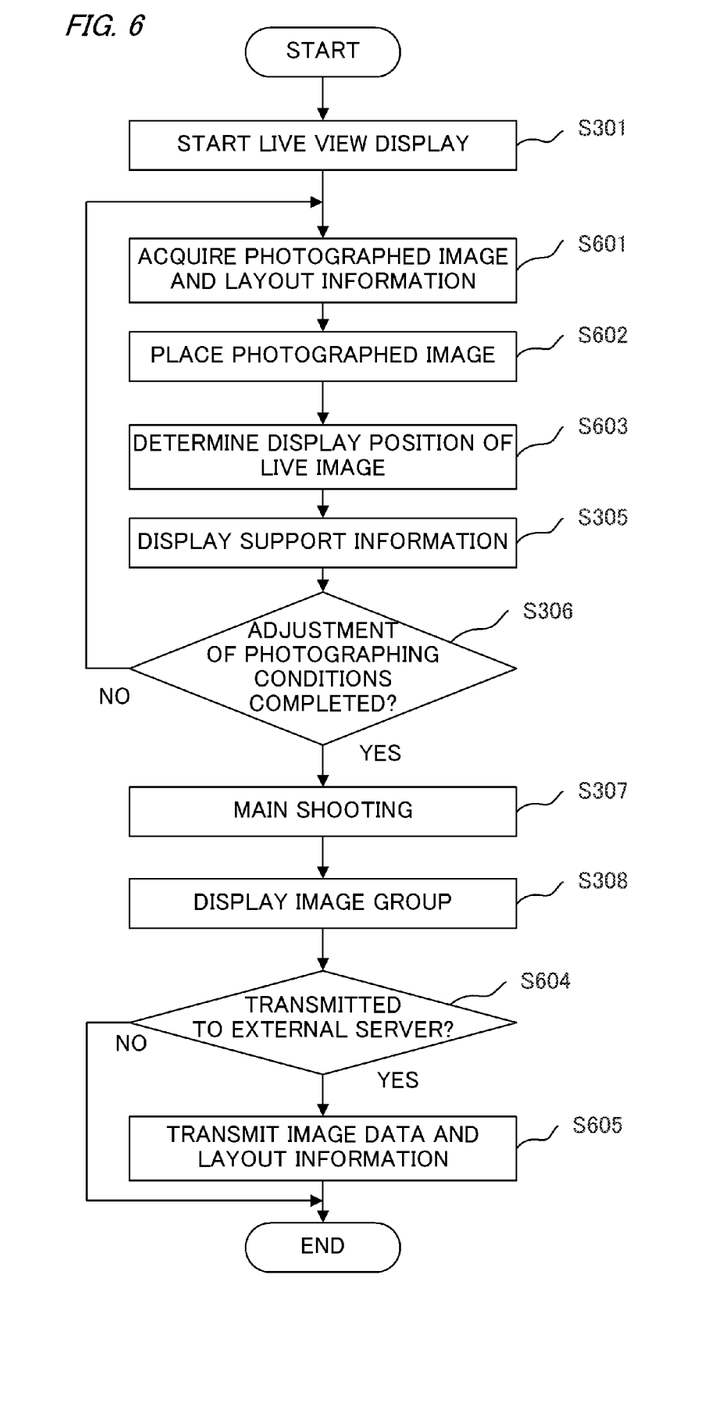
FIG. 6 is a flowchart indicating photography according to Embodiment 2.

Photography according to Embodiment 2: FIG. 6 is a flowchart illustrating photography according to Embodiment 2. Referring to FIG. 6, the photography of the smartphone 100 according to the present embodiment will be specifically described below. The steps of photography are performed by a control unit 101 or the blocks of the smartphone 100 having received an instruction from the control unit 101. The same steps as those of photography according to Embodiment 1 in FIG. 3 are indicated by the same reference numerals and a detailed explanation thereof is omitted.

In step S301, the control unit 101 starts live view display. In step S601, the control unit 101 (an acquisition unit) acquires, via a communication unit 111 (a transmitting unit), the photographed images recorded in the external server and the corresponding layout information. Embodiment 2 is described according to an example in which seven photographed images and the corresponding layout information are acquired. It is assumed that the layout information acquired from the external server includes information on a pattern of display positions for placing images as described in Embodiment 1.

In step S602, the control unit 101 places the seven photographed images, which are acquired in step S601, on the live-view display screen based on the corresponding layout information. Specifically, the control unit 101 places the photographed images at the respective positions in the pattern of the display positions included in the layout information.

Figure 7A:
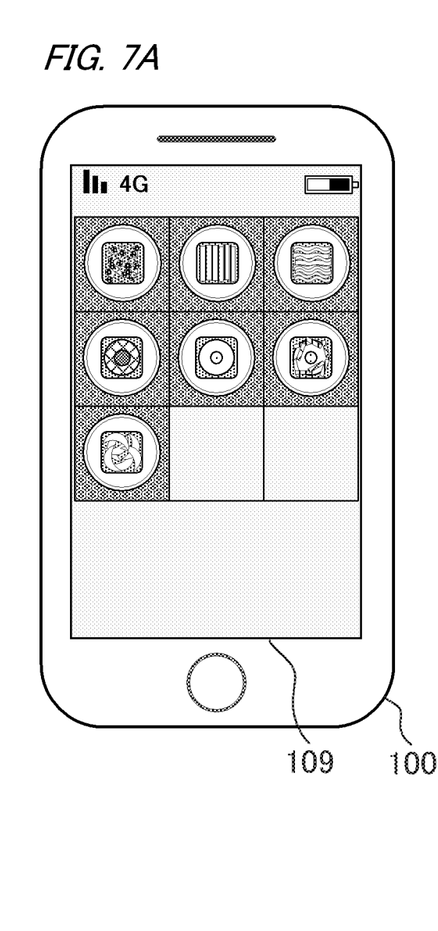
FIGS. 7A to 7C are explanatory drawings illustrating the screen examples of photography according to Embodiment 2.

Referring to FIG. 7A, the layout of the photographed images will be described below. FIG. 7A illustrates an example of the layout of the seven photographed images, which are acquired from the external server, on the live-view display screen based on the corresponding layout information.

FIG. 7A illustrates the display example in which the seven photographed images are displayed at seven points in the pattern including nine rectangular regions. The photographed images are not placed in the bottom-center and bottom-right rectangular regions of the nine rectangular regions.

As described above, the smartphone 100 can acquire the photographed images that are recorded in the external server and the corresponding layout information and place the photographed images on the live-view display screen based on the corresponding layout information. In other words, the smartphone 100 can replicate the display of a list of the photographed images in the same layout as in a viewing of the accessed external server.

The display positions of the photographed images on the live-view display screen may be changed by a user. The user selects the photographed image as an image to be relocated and drags and drops the image at a desired position, thereby changing the position of the photographed image. If the photographed image has been already placed at the desired position, the image to be relocated may be dragged and dropped at a destination so as to be changed with the photographed image at the destination.

In step S603, the control unit 101 determines a position for displaying a live image on the live-view display screen. For example, the control unit 101 can determine, as the display position of the live image, the region selected by the user from the rectangular regions having no photographed images.

Figure 7B:
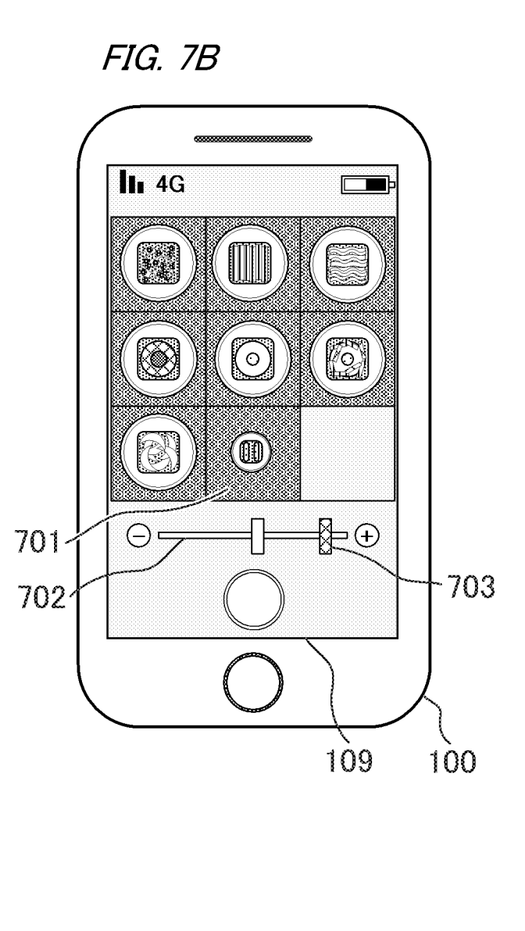

Referring to FIG. 7B, the determination of the display position of the live image will be described below. For example, from among the nine rectangular regions of FIG. 7A, the user selects the bottom-center or bottom-right rectangular region, in which no photographed images are placed, with a touch of the screen as the display position of the live image. FIG. 7B illustrates an example in which the user selects a bottom-center rectangular region 701 from the nine rectangular regions. The control unit 101 displays a live image in the rectangular region 701 selected by the user.

In step S305, the control unit 101 generates support information from the photographed images and presents the information to the user as in Embodiment 1. As illustrated in FIG. 7B, when determining the position of the live image, the control unit 101 generates the support information from the photographed images and displays a target value 703 as the support information on a slider bar 702. The user can change the photographing conditions with reference to the support information. The control unit 101 changes the photographing conditions of the live image based on a user instruction.

In step S306, the control unit 101 determines whether the adjustment of the photographing conditions by the user has been completed. If the adjustment of the photographing conditions has not been completed (step S306:NO), the processing returns to step S601, and then the processing of steps S601, S602, S603, and S305 is repeated until the adjustment of the photographing conditions is completed. If the adjustment of the photographing conditions has been completed (step S306:YES), the processing advances to step S307.

In steps S307 and S308, the control unit 101 associates, as an image group, the photographed image of the live image in main shooting with the photographed images in the pattern as in Embodiment 1 and records the image group in a storage unit. Moreover, the control unit 101 records the used pattern, the positions of the photographed image in the pattern, and the positions of the photographed images as layout information in the storage unit.

In step S604, the control unit 101 determines whether image data on the image group and the layout information are to be transmitted to the external server, via the communication unit 111 based on a user instruction.

Figure 7C:
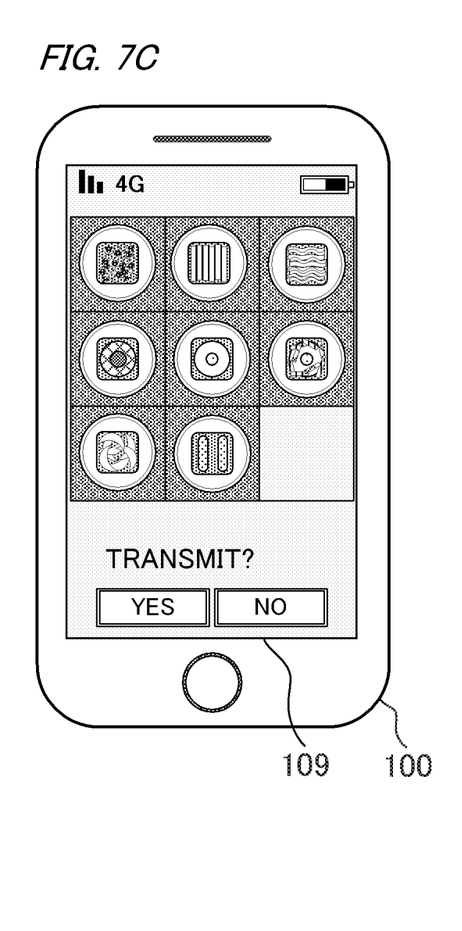

Referring to FIG. 7C, the reception of an instruction to transmit the image data on the image group and the layout information will be described below. FIG. 7C illustrates a screen example that indicates the images of the image group displayed in step S308 of FIG. 6 and a UI for receiving an instruction of transmission from the user. The user can confirm the uniformity of the compositions, brightness, and tinges of the displayed images and determine whether the image data on the image group and the layout information are to be transmitted to the external server.

If the image data on the image group and the layout information are to be transmitted to the external server, the user presses (touches) "Yes" button. In response to the operation on "Yes" button, the control unit 101 determines that the image data on the image group and the layout information are to be transmitted to the external server (step S604:YES), the processing advances to step S605.

If the image data on the image group and the layout information are not to be transmitted to the external server, the user presses (touches) "No" button. In response to the operation on "No" button, the control unit 101 determines that the image data on the image group and the layout information are not to be transmitted to the external server (step S604:NO), the photography in FIG. 6 is completed.

In step S605, the control unit 101 transmits the image data on the image group and the corresponding layout information to the external server via the communication unit 111, so that the photography in FIG. 6 is completed.

In Embodiment 2, the external server can display the images in the image group in the layout of photography based on the image data on the image group received from the smartphone 100 and the corresponding layout information. This enables the user who accesses the external server from a web browser or the like and views the image group to view the images in the same layout as in photography by the smartphone 100.

The present invention can easily adjust the photographing conditions such as compositions, brightness, and tinges according to photographed images while a live image is viewed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-144855, filed on Aug. 28, 2020, which is hereby incorporated by reference herein in its entirety.

What is claimed is:

1. An imaging apparatus for performing photography in a state where a live image is displayed, the imaging apparatus comprising at least one memory and at least one processor which function as:

a display unit configured to display the live image on a display and to display a slider bar with an indicator;
a selection unit configured to select a plurality of photographed images;
a generating unit configured to generate support information, which indicates a target for changing photographing conditions of the live image, on the basis of information on the selected photographed images, and to display the generated support information on the display;
a changing unit configured to change the photographing conditions of the live image on the basis of a user operation to change a position of the indicator on the slider bar displayed by the display unit; and
a photographing unit configured to photograph the live image according to the changed photographing conditions,
wherein the generated support information is displayed as a target position on the slider bar, and
wherein the display unit displays the live image on the display by using the changed photographing conditions when the changing unit changes the photographing conditions of the live image.

2. The imaging apparatus according to claim 1, wherein the generated support information is information indicating average photographing conditions of the selected photographed images.

3. The imaging apparatus according to claim 1, wherein the generated support information is information used for adjusting at least any of brightness, a tinge, and a composition of the live image.

4. The imaging apparatus according to claim 1, wherein the generated support information includes at least any of information on average brightness, information on a Bv value (Brightness Value), information on a color temperature, and information on a composition line.

5. The imaging apparatus according to claim 1, further comprising a recording unit for recording image data, wherein
the selection unit is configured to place on the display the photographed images, selected from the image data recorded in the recording unit, on the basis of a user operation.

6. The imaging apparatus according to claim 5, wherein
the recording unit further records layout information on the image data, and
the selection unit is configured to place on the display the selected photographed images on the basis of layout information associated with the selected photographed images.

7. The imaging apparatus according to claim 1, wherein the photographing conditions include at least one of a condition relating to a composition, a condition relating to exposure, and a condition relating to image quality.

8. The imaging apparatus according to claim 1, wherein the at least one memory and the at least one processor further function as an acquisition unit configured to acquire, from an external server, the plurality of photographed images and the layout information associated with the plurality of photographed images, wherein
the selection unit is configured to place on the display the plurality of photographed images, acquired from the external server, on the basis of the layout information associated with the plurality of photographed images.

9. The imaging apparatus according to claim 1, wherein the at least one memory and the at least one processor further function as a transmitting unit configured to transmit, to the external server, a photographed image of the live image, the photographed images selected during photography, and the layout information associated with the photographed image of the live image and the photographed images selected during photography.

10. The imaging apparatus according to claim 1, wherein the changing unit is configured to inform a user that the photographing conditions are being changed to be close to the support information displayed on the display.

11. The imaging apparatus according to claim 1, wherein the generating unit is configured to generate the support information indicating a target for changing the photographing conditions of the live image on the basis of information on part of photographed images among the selected photographed images.

12. The imaging apparatus according to claim 11, wherein the generating unit is configured to determine the part of photographed images on the basis of a layout indicating a predetermined layout pattern.

13. The imaging apparatus according to claim 1, wherein the generating unit is configured to generate the support information indicating a target for changing the photographing conditions of the live image by weighting the information on the selected photographed images on the basis of positional relationship with the live image.

14. The imaging apparatus according to claim 1, wherein when the photographed images selected by the selecting unit on the display are changed, the generating unit is configured to change the support information, displayed on the display, to support information generated on the basis of information on the changed photographed images.

15. A method for controlling an imaging apparatus for performing photography in a state where a live image is displayed,
the method comprising the steps of:
displaying the live image on a display;
displaying a slider bar with an indicator;
selecting a plurality of photographed images;
generating support information indicating a target for changing photographing conditions of the live image on the basis of information on the selected photographed images, and displaying the generated support information on the display;
changing the photographing conditions of the live image on the basis of a user operation to change a position of the indicator on the slider bar; and
photographing the live image according to the changed photographing conditions,
wherein the generated support information is displayed as a target position on the slider bar, and
wherein the live image is displayed on the display by using the changed photographing conditions when the photographing conditions of the live image is changed in the changing step.

16. The method for controlling an imaging apparatus according to claim 15, wherein in the generating step, when the photographed images selected on the display are changed, the support information displayed on the display is changed to support information generated on the basis of information on the changed photographed images.

17. A non-transitory computer-readable storing medium that stores a program for causing a computer to execute a method for controlling an imaging apparatus for performing photography in a state where a live image is displayed, the method comprising the steps of:
displaying the live image on a display;
displaying a slider bar with an indicator;
selecting a plurality of photographed images;
generating support information indicating a target for changing photographing conditions of the live image on the basis of information on the selected photographed images, and displaying the generated support information on the display;
changing the photographing conditions of the live image on the basis of a user operation to change a position of the indicator on the slider bar; and
photographing the live image according to the changed photographing conditions,
wherein the generated support information is displayed as a target position on the slider bar, and
wherein the live image is displayed on the display by using the changed photographing conditions when the photographing conditions of the live image is changed in the changing step.

* * * * *